US010179367B1

(12) United States Patent
    Lo

(10) Patent No.: US 10,179,367 B1
(45) Date of Patent: Jan. 15, 2019

(54) DAMPING ARBOR

(71) Applicant: Kun-Chi Lo, Taichung (TW)

(72) Inventor: Kun-Chi Lo, Taichung (TW)

( * ) Notice: Subject to any disclaimer, the term of this patent is extended or adjusted under 35 U.S.C. 154(b) by 0 days.

(21) Appl. No.: 15/890,780

(22) Filed: Feb. 7, 2018

(51) Int. Cl.
    *B23B 29/00*      (2006.01)
    *B23B 29/12*      (2006.01)
    *F16F 13/04*      (2006.01)
    *F16F 15/02*      (2006.01)
    *F16F 15/124*     (2006.01)

(52) U.S. Cl.
    CPC ............. *B23B 29/12* (2013.01); *F16F 13/04* (2013.01); *F16F 15/022* (2013.01); *F16F 15/124* (2013.01); *B23B 2250/16* (2013.01); *F16F 2224/025* (2013.01); *F16F 2234/02* (2013.01)

(58) Field of Classification Search
    CPC . B23B 29/12; B23B 2250/16; B23B 2250/04; B23B 2250/08; B23B 2260/068; B23C 2250/16; B23C 2250/04; B23C 2250/08
    See application file for complete search history.

(56) References Cited

U.S. PATENT DOCUMENTS

| | | | | |
|---|---|---|---|---|
| 5,605,420 A | * | 2/1997 | Feldsine | ................ B23C 5/006 407/32 |
| 9,468,977 B2 | * | 10/2016 | McCormick | ............ B23B 31/08 |
| 9,855,610 B2 | * | 1/2018 | Frank | .................... B23B 27/002 |
| 2008/0277886 A1 | * | 11/2008 | Peter | ..................... B23B 31/001 279/60 |
| 2011/0222975 A1 | * | 9/2011 | Short | .................... B23B 29/125 408/17 |
| 2012/0207560 A1 | * | 8/2012 | Sakamaki | ............... B23B 31/00 409/141 |
| 2015/0283628 A1 | * | 10/2015 | Gamble | .................. B23C 5/003 407/11 |
| 2016/0107242 A1 | * | 4/2016 | McCormick | ............ B23B 31/08 279/143 |
| 2016/0214182 A1 | * | 7/2016 | Eichelberger | ......... B23B 29/022 |
| 2017/0157683 A1 | * | 6/2017 | Nedzlek | .................. B23C 5/003 |
| 2017/0197251 A1 | * | 7/2017 | Nakatani | ............... F16F 15/126 |
| 2018/0009042 A1 | * | 1/2018 | Chen | ........................ B23C 5/003 |
| 2018/0093329 A1 | * | 4/2018 | Umstadt | ............... B23B 27/002 |

* cited by examiner

*Primary Examiner* — Will Fridie, Jr.
(74) *Attorney, Agent, or Firm* — Muncy, Geissler, Olds & Lowe, P.C.

(57) ABSTRACT

The present invention relates to a damping arbor, including a rod body and a damping mechanism. A diameter of the rod body is larger than or equal to 60 mm. The rod body includes an end surface for being connected with a cutter head assembly and further defining an axis. The damping mechanism includes at least three shock absorbing assemblies. The at least three shock absorbing assemblies are inserted into the end surface and surrounding the axis with equal intervals.

9 Claims, 6 Drawing Sheets

DAMPING ARBOR

BACKGROUND OF THE INVENTION

Field of the Invention

The present invention relates to a processing cutter, especially to a damping arbor.

Description of the Prior Art

Processing methods for cutting a workpiece are roughly classified into workpiece rotation process and cutter rotation process. Specifically, stability of a cutter is closely related to surface quality of the workpiece. Therefore, how to reduce the vibration of cutter in the process is a goal that urgently needs to be improved to achieve for the desired processing quality, simple processing steps, and shortened processing time.

The conventional damping mechanism is composed of several components, and a rubber ring is disposed between each of the components and the junction connected to a cutter head respectively to absorb vibration. This manufacturing process is not only complicated and time-consuming but also have poor damping effect. The entire cutter cannot process a surface of the workpiece with better stability. Moreover, this damping method is unable to have good damping effect for a larger cutter. The rubber ring is easily deformed and broken due to a weight of the rod body when the cutter is not in use.

The present invention is, therefore, arisen to obviate or at least mitigate the above-mentioned disadvantages.

SUMMARY OF THE INVENTION

The main object of the present invention is to provide a damping arbor, which achieves a better damping effect through a plurality of shock absorbing assemblies disposed averagely. In addition, a weight of a damping mechanism is averagely shared out among a plurality of shock absorbing assemblies instead of born by a single component when a rod body is not in use, so it may have longer service life.

To achieve the above and other objects, the present invention provides a damping arbor, including a rod body and a damping mechanism. A diameter of the rod body is larger than or equal to 60 mm, the rod body including an end surface for being connected with a cutter head assembly and further defining an axis; the damping mechanism including at least three shock absorbing assemblies, the at least three shock absorbing assemblies being inserted into the end surface and surrounding the axis with equal intervals.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
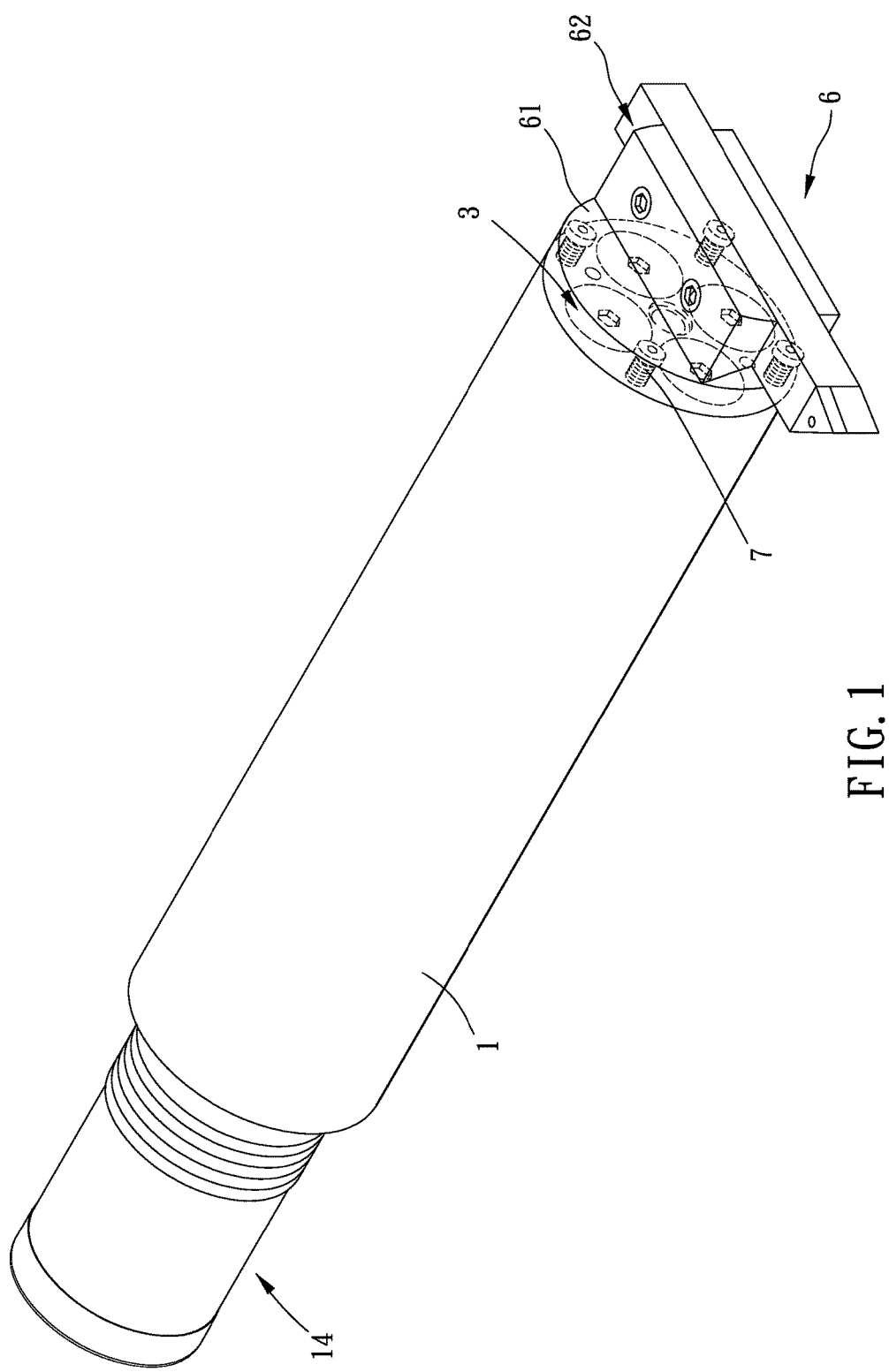
FIG. 1 is a stereogram of a preferable embodiment of the present invention.
Figure 2:
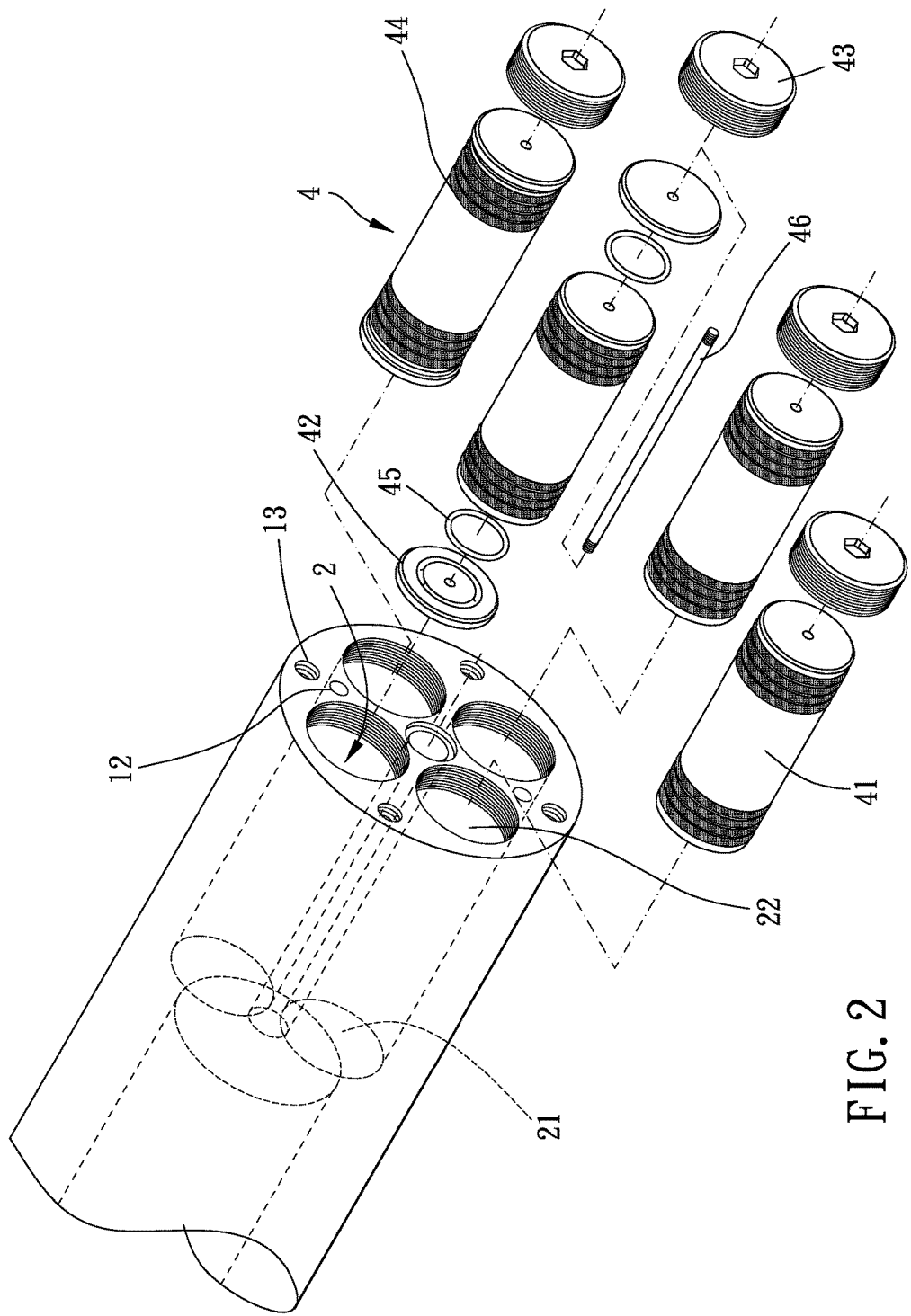
FIG. 2 is a breakdown drawing of FIG. 1.
Figure 3:
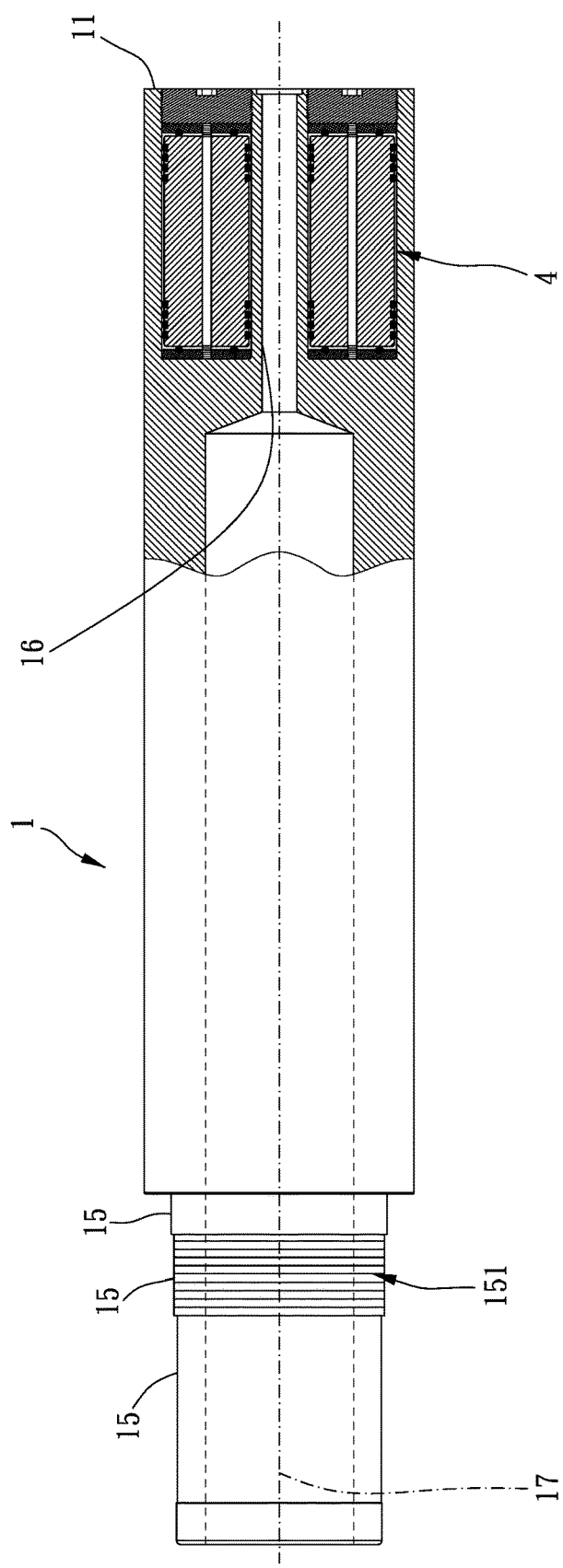
FIG. 3 is a partial cross-sectional view of a side view of FIG. 1.
Figure 4:
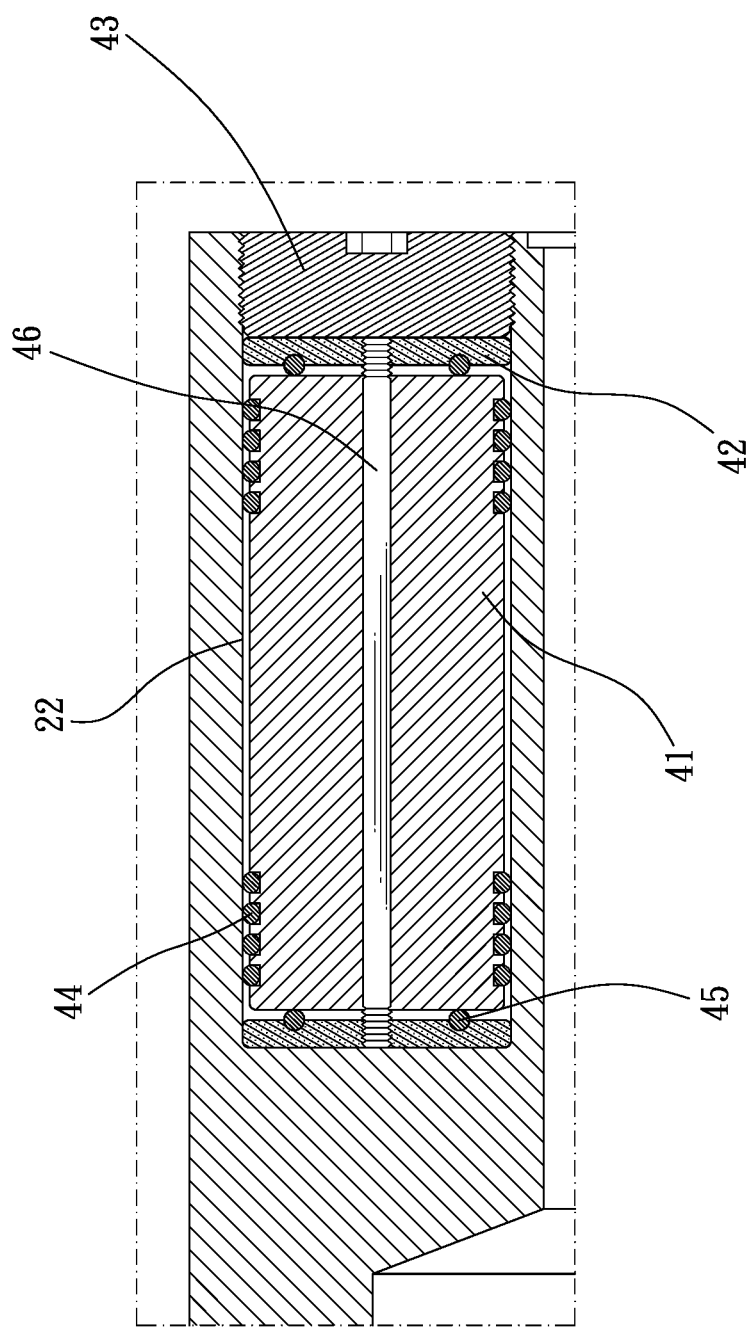
FIG. 4 is a partial enlargement of FIG. 1.
Figure 5:
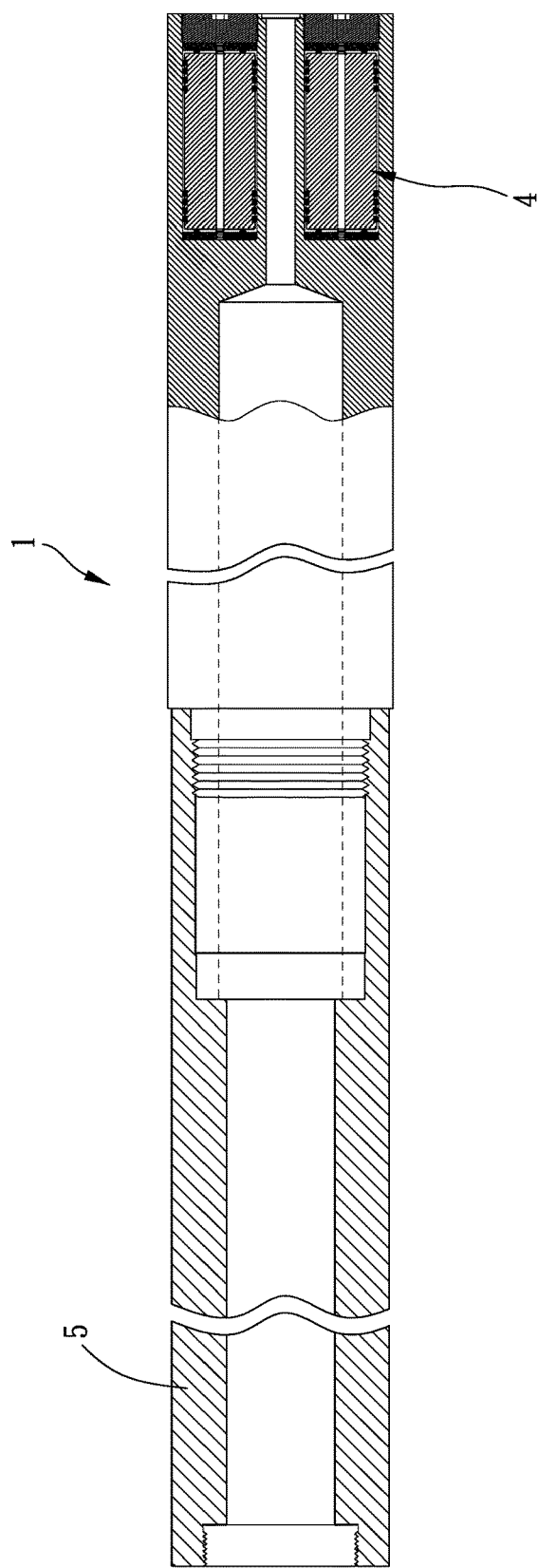
FIG. 5 is a schematic diagram of a preferable embodiment of the present invention in use.

Please refer to FIGS. 1 to 5 for a preferable embodiment of the present invention. A damping arbor includes a rod body 1 and a damping mechanism 3.

A diameter of the rod body 1 is larger than or equal to 60 mm so it is applied to large processing cutters, wherein, the rod body 1 including an end surface 11 for being connected with a cutter head assembly 6 and further defining an axis 17. The damping mechanism 3 includes at least three shock absorbing assemblies 4. The at least three shock absorbing assemblies 4 are inserted into the end surface 11 and surrounding the axis 17 with equal intervals. Therefore, the at least three shock absorbing assemblies 4 provide equal damping effect at different positions of the rod body 1 so that a cutter equipped with the damping arbor has uniform effect of vibration absorption to ensure stability of the cutter in a processing program. In an over view, the at least three shock absorbing assemblies 4 are able to share out a weight of the rod body 1 so the damping arbor can be placed stably and prevented from damaging when it is not in use. Besides, multiple configuration structures of the at least three shock absorbing assemblies 4 make a broken part of the shock absorbing assemblies 4 be changeable and not have to replace the entire damping mechanism 3. Therefore, the shock absorbing assemblies 4 have advantages of cost saving and easier replacement.

Specifically, the rod body 1 further includes at least three receiving rooms 2, and each of the receiving rooms 2 is concavely extended from the end surface 11 along a direction parallel to the axis 17. Each of the receiving rooms 2 includes a bottom wall 21 and an annular wall 22. The at least three shock absorbing assemblies 4 are disposed in the at least three receiving rooms 2 respectively. Each of the shock absorbing assemblies 4 including a damper 41, two vibration absorbers 42 and a blocking portion 43. The damper 41 is received in the receiving rooms 2, and the blocking portion 43 is used to cover the receiving rooms 2. One of the vibration absorbers 42 is disposed between the damper 41 and the bottom wall 21, and the other of the vibration absorbers 42 is disposed between the damper 41 and the blocking portion 43. As a result, the two vibration absorbers 42 are served as cushion for vibration in an axial direction to reduce vibration amplitude of the damper 41 in the vibration process.

Preferably, each of the shock absorbing assemblies 4 further includes a connecting rod 46. The connecting rod 46 movably penetrates the damper 41 so as to connect and position the two vibration absorbers 42 respectively. In this embodiment, the vibration absorbers 42 are screwed on one end of the connecting rod 46. The connecting rod 46 can prevent the two vibration absorbers 42 from leaving the original position due to the continuous compression by the damper 41 to keep a better vibration absorbing function. Specifically, the vibration absorbers 42 are rubber material such as polyurethane and ultra-high molecular weight polyethylene.

In addition, the blocking portion 43 of each of the shock absorbing assemblies 4 is detachably positioned on the annular wall 22, for example but not limitation, the blocking portion 43 is screwed onto the annular wall 22. The blocking portion 43 preferably shuts the receiving rooms 2 to effectively block debris (such as dust and processing shavings)

from getting into the receiving rooms 2 and to ensure a vibration absorbing effect of the damper 41 and the two vibration absorbers 42. Especially noted that, the blocking portion 43 is a single component in this embodiment. However, the blocking portion could be a part of the cutter head assembly in other embodiments.

Moreover, the end surface 11 further has a plurality of positioning holes 12 and a plurality of screw holes 13. Each of the positioning holes 12 is configured to embed and position part of the cutter head assembly 6 so that the user can be quickly and clearly informed a precise assembly position. Each of the screw holes 13 is configured to allow a fastener 7 to screw the cutter head assembly 6 on the rod body 1 so as to reinforce the connection between the cutter head assembly 6 and the rod body 1. Specifically, the cutter head assembly 6 includes a switching tray 61 and a processing cutter head 62. The switching tray 61 is positioned at the rod body 1 via the fastener 7, and the processing cutter head 62 is detachably clamped and positioned on the switching tray 61. The processing cutter head 62 is, for example, but not limited to a turning tool, a milling cutter, a boring cutter or other cutting tools.

In this embodiment, a number of the at least three shock absorbing assemblies 4 is four; a number of the plurality of positioning holes 12 is two; a number of the plurality of screw holes 13 is four. The four screw holes 13 are disposed around the axis 17 with equal intervals and misaligned with the four shock absorbing assemblies 4 so that the switching tray 61 can be averagely and stably screwed onto the end surface 11. Besides, the two positioning holes 12 and two of the screw holes 13 are in alignment for accurate positioning. In addition, a diameter of each of the receiving rooms 2 is 0.375 to 0.4375 times a diameter of the rod body 1 to have an appropriate cross-sectional area to disperse force. A length of each of the receiving rooms 2 is 0.2 to 0.4 times a length of the rod body 1 along the extending direction of the axis 17 to avoid the structural strength of the rod body 1 from reduction.

Figure 6:
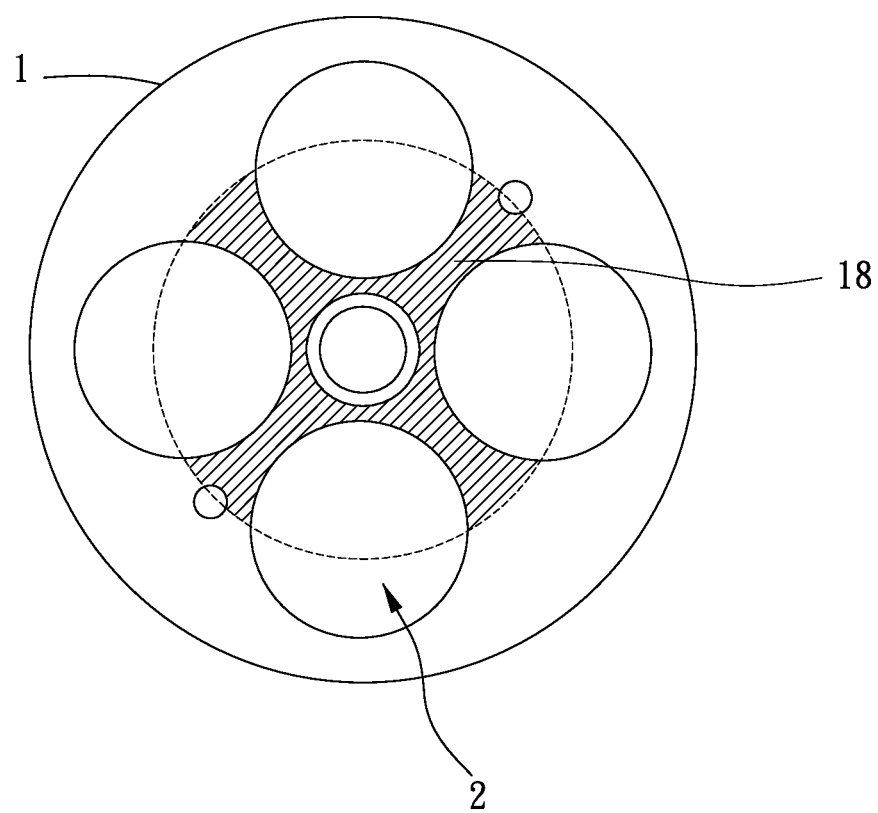
FIG. 6 is a schematic diagram of a rod body of a preferable embodiment when observing along an axis.

It is emphasized that, the rod body 1 have the plurality of receiving rooms 2 to respectively receive the at least three shock absorbing assemblies 4. Compared to directly forming a large through hole, the present invention further increases a cross-sectional area of the rod body 1 and makes the rod body 1 solid to effectively increase a moment of inertia and a rigidity of the rod body 1 to resist a bending moment and not easy to bend and deform. In other words, the rod body 1 is not easy to deform to ensure accuracy of process. For example, referring to FIG. 6, the cross-sectional area of the rod body 1 is increased due to a cross-like rib 18 when observing along the axial direction of the rod body 1 so as to strengthen the entire rod body 1 to make it difficult to deform.

It is understandable that the cutter may constantly produce heat due to friction when processing, as a result, the rod body 1 further has a channel 16. The channel 16 penetrates the end surface 11 along with an extending direction of the axis 17 to communicate with the cutter head assembly 6. The channel 16 and each of the receiving rooms 2 are uncommunicated, and the channel 16 allows a cutting fluid to flow therein for cooling and lubricating the cutter head assembly 6 and workpiece. Wherein, the channel 16 is smaller than each of the receiving rooms 2 in radial dimension when observing along the axis 17, each of the screw holes 13 is larger than each of the positioning holes 12 but smaller than the channel 16 in radial dimension.

More specifically, an end of the rod body 1 away from the end surface 11 is an assembly head 14, the assembly head 14 having a plurality of stepped portions 15. One of the stepped portions 15 has a threaded section 151 to insert into and screw with an extension bar 5, and the extension bar 5 communicates with the channel 16 to let the cutting fluid flow therein. The extension bar 5 is served as the object clamped and fastened by a blade holder, so as to maintain a structure of the rod body 1 and have a longer service life. Besides, users can correspondingly choose a different length of the extension bar 5 to assemble to the rod body 1 according to a processing depth of the workpiece, so that needs of a variety processing depths are satisfied. Thus, the process becomes more convenient and quicker.

More specifically, the assembly head 14 is provided with three said stepped portions 15 tapered off in radial dimension, and the threaded section 151 is disposed on the middle stepped portions 15. The three stepped portions 15 can increase a contact area of the assembly head 14 and the extension bar 5 to have a better combination.

After that, the damping mechanism 3 will be further described. Each of the shock absorbing assemblies 4 further includes at least one first damping member 44, the at least one first damping member 44 is disposed on the damper 41 and interposed between the damper 41 and the annular wall 22. The at least one first damping member 44 is able to support the damper 41 in a radial direction of the rod body 1 and to reduce a vibration amplitude of the damper 41 to prevent the damper 41 from ramming the annular wall 22 and being damaged in the radial direction due to vibration. The at least one first damping member 44 and the two vibration absorbers 42 are cooperated to achieve a vibration-absorbing effect in the axial and radial directions of the rod body 1.

More specifically, each of the shock absorbing assemblies 4 further includes at least two second damping members 45, the at least two second damping members 45 are disposed between the damper 41 and one of the vibration absorbers 42 respectively. Similarly, the at least two second damping members 45 is able to support the damper 41 in the axial direction of the rod body 1 and to absorb vibrations from the axial direction. Therefore, the cooperation of each of the second damping members 45 and the vibration absorbers 42 provides a double cushion to have better vibration-absorbing effect.

In this embodiment, the damper 41 is columnar, each of the first damping members 44 is annular and embedded at two ends of the damper 41, each of the second damping members 45 is annular and embedded in the vibration absorbers 42. Besides, each of the first damping members 44, each of the second damping members 45, and the two vibration absorbers 42 are made of flexible materials, wherein, a flexibility of each of the vibration absorbers 42 is larger than that of each of the first damping members 44 and that of each of the second damping members 45. In other words, each of the first damping member 44 and each of the second damping members 45 are relatively hard to have better structural strength to support the damper 41. Furthermore, a weight of the single damper 41 is lighter since a damping structure for cushioning is divided into four of the damper 41. Therefore, each of the first damping member 44 and each of the second damping members 45 in each of the shock absorbing assemblies 4 are able to support a weight of the damper 41 in the axial and radial direction when the cutter is not in use so that they are not easy to be compressed and broken and have a better service time.

In summary, the damping arbor of this invention is to construct the plurality of shock absorbing assemblies into the damping mechanism, making the shock absorbing assemblies provide equal damping effects at different positions of the rod body so as to have uniform effect of vibration absorption and make the cutter more stable in the processing program. Moreover, the plurality of shock absorbing assemblies make damping structure be divided into a plurality of damper to make a weight of each of the damper lighter. Thus, the first damping member and the second damping members have sufficient structural strength to support the damper when the cutting tool is not in use.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A damping arbor, including:
a rod body, a diameter of the rod body being larger than or equal to 60 mm, the rod body including an end surface for being connected with a cutter head assembly and further defining an axis;
a damping mechanism, including at least three shock absorbing assemblies, the at least three shock absorbing assemblies being inserted into the end surface and surrounding the axis with equal intervals;
wherein the rod body further includes at least three receiving rooms, each of the receiving rooms are concavely extended from the end surface along a direction parallel to the axis, each of the receiving rooms includes a bottom wall and an annular wall; the at least three shock absorbing assemblies are disposed in the at least three receiving rooms respectively, each of the shock absorbing assemblies includes a damper, two vibration absorbers, and a blocking portion, the damper is received in the receiving room, the blocking portion is used to cover the receiving room, one of the vibration absorbers is disposed between the damper and the bottom wall, the other of the vibration absorbers is disposed between the damper and the blocking portion.

2. The damping arbor of claim 1, wherein each of the shock absorbing assemblies further includes at least one first damping member, the at least one first damping member is disposed on the damper and interposed between the damper and the annular wall.

3. The damping arbor of claim 2, wherein each of the shock absorbing assemblies further includes at least two second damping members, the at least two second damping members are disposed between the damper and one of the vibration absorbers respectively.

4. The damping arbor of claim 3, wherein each of shock absorbing assemblies further includes a connecting rod, the connecting rod movably penetrates the damper so as to connect and position the two vibration absorbers respectively.

5. The damping arbor of claim 1, wherein the blocking portion of each of the shock absorbing assemblies is detachably positioned on the annular wall, and the blocking portion shuts the receiving room.

6. A damping arbor, including:
a rod body, a diameter of the rod body being larger than or equal to 60 mm, the rod body including an end surface for being connected with a cutter head assembly and further defining an axis;
a damping mechanism, including at least three shock absorbing assemblies, the at least three shock absorbing assemblies being inserted into the end surface and surrounding the axis with equal intervals;
wherein the end surface further has a plurality of positioning holes and a plurality of screw holes, each of the positioning holes is configured to embed and position part of the cutter head assembly therein, each of the screw holes is configured to allow a fastener to screw the cutter head assembly on the rod body.

7. The damping arbor of claim 1, wherein the rod body further has a channel, the channel penetrates the end surface along with an extending direction of the axis to communicate with the cutter head assembly.

8. The damping arbor of claim 7, wherein an end of the rod body away from the end surface is an assembly head, the assembly head has a plurality of stepped portions, one of the stepped portions has a threaded section to insert into and screw with an extension bar, and the extension bar communicates with the channel.

9. The damping arbor of claim 4, wherein the blocking portion of each of the shock absorbing assemblies is detachably positioned on the annular wall, and the blocking portion shuts the receiving rooms; the end surface further has a plurality of positioning holes and a plurality of screw holes, each of the positioning holes is configured to embed and position part of the cutter head assembly therein, each of the screw holes is configured to allow a fastener to screw the cutter head assembly on the rod body; the rod body further has a channel, the channel penetrates through the end surface along with an extending direction of the axis to communicate with the cutter head assembly; the rod body is an assembly head at an end away from the end surface, the assembly head has a plurality of stepped portions, one of the stepped portions has a threaded section to screw into an extension bar, the extension bar communicates with the channel; a number of the at least three shock absorbing assemblies is four; a number of the plurality of positioning holes is two; a number of the plurality of screw holes is four; the four screw holes are disposed around the axis with equal intervals and misaligned with the four shock absorbing assemblies; the two positioning holes and two of the screw holes are in alignment; the channel is smaller than each of the receiving rooms in radial dimension when observing along the axis, the channel and each of the receiving rooms are uncommunicated, each of the screw holes is larger than each of the positioning holes but smaller than the channel in radial dimension; a diameter of each of the receiving rooms is 0.375 to 0.4375 times a diameter of the rod body; a length of each of the receiving rooms is 0.2 to 0.4 times a length of the rod body along the extending direction of the axis; the blocking portion is screwed onto annular wall; the damper is columnar, each of the first damping members is annular and embedded at two ends of the damper, each of the second damping members is annular and embedded in the vibration absorbers; each of the vibration absorbers is screwed on one end of the connecting rod; the assembly head is provided with three said stepped portions tapered off in radial dimension, the threaded section is disposed on the middle stepped portion; each of the first damping members, each of the second damping members, and the two vibration absorbers are made of flexible materials, a flexibility of each of the vibration absorbers is larger than that of each of the first damping members and that of each of the second damping members.

* * * * *